Oct. 13, 1953          W. L. WELLS          2,655,022
TOWEL DISPENSING AND LAUNDERING APPARATUS
Filed Nov. 4, 1950          2 Sheets—Sheet 1
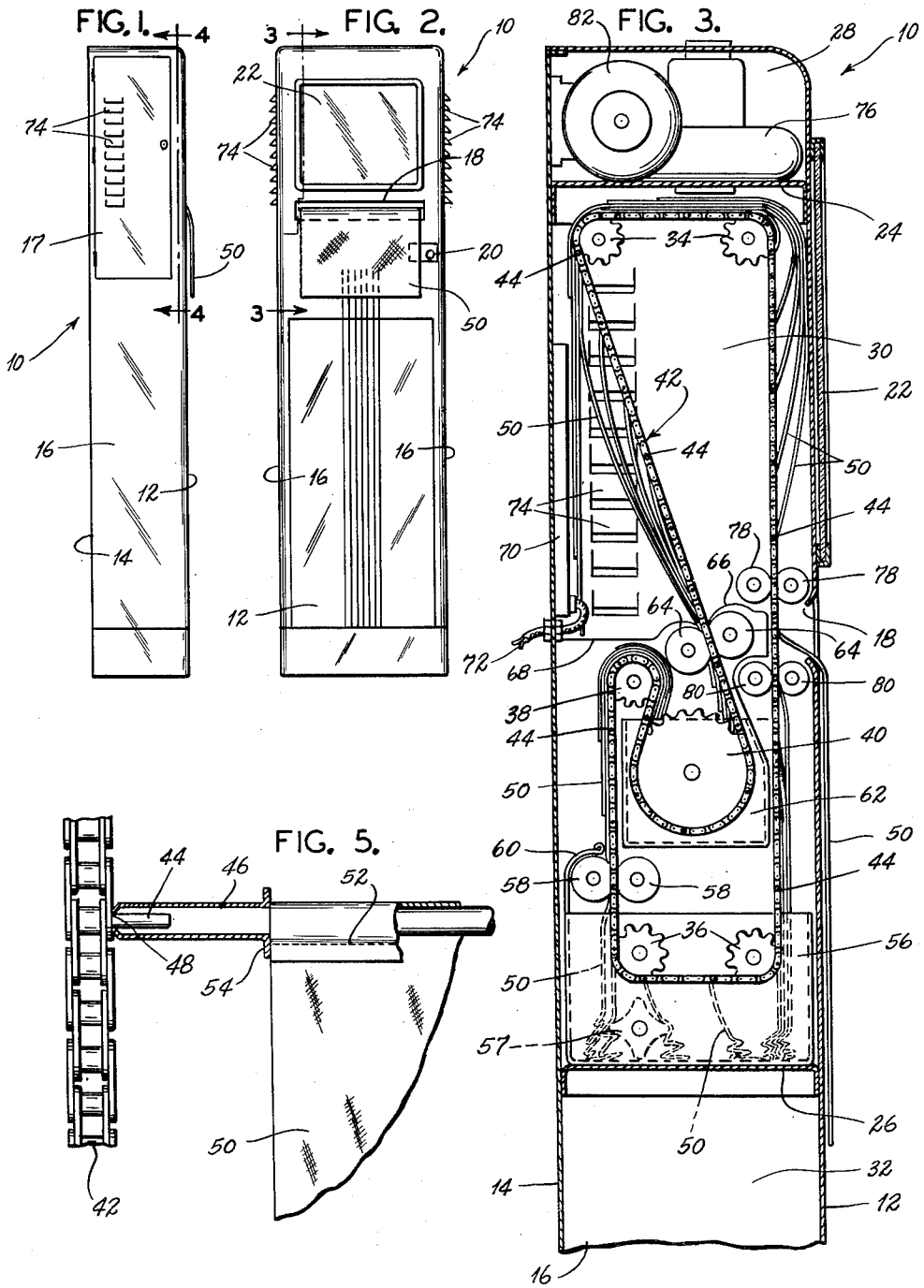
INVENTOR:
WILLIS L. WELLS,
BY Kingsland, Rogers & Ezell
ATTORNEYS.

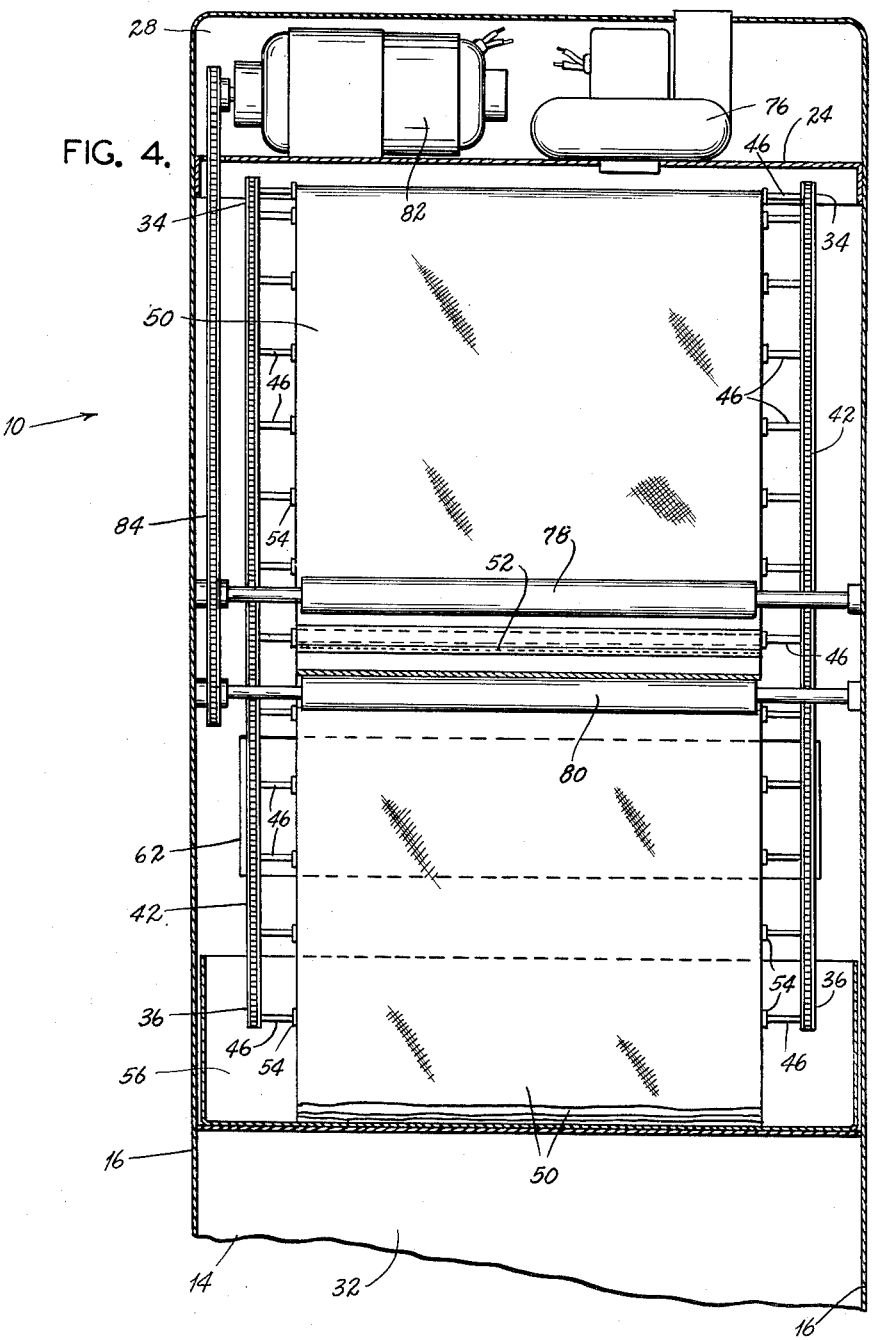

Patented Oct. 13, 1953

2,655,022

UNITED STATES PATENT OFFICE 2,655,022

TOWEL DISPENSING AND LAUNDERING APPARATUS

Willis L. Wells, Clayton, Mo.

Application November 4, 1950, Serial No. 194,054

12 Claims. (Cl. 68—22)

The present invention relates generally to the dispensing art, and more particularly to a novel towel dispensing and laundering apparatus which employs a plurality of individual towels.

In one form, the device comprises a housing including a front panel containing an aperture. A continuous conveyor is disposed within the housing, and removably mounted on it at spaced intervals are a series of individual towels, each of the latter being fastened to the conveyor adjacent one end. The length of the towels and the spacing between them are such that the towels overlap so as to provide a maximum amount of toweling within the space defined by the housing. Feed rollers are provided for automatically causing the free end of one towel at a time to extend through the aperture for use, and retracting rollers are provided for withdrawing the towel after use. Means are contained within the housing for laundering and drying the soiled towels so as to recondition them for reuse, the conveyor being automatically responsive to manually operable control means for carrying the towels past the aperture and thence through the reconditioning means.

Several patents have been granted in recent years for devices for dispensing and automatically laundering towels, but these devices are impractical for numerous reasons, among which is that they employ an endless towel. This is unsatisfactory because it requires a very large machine to provide an adequate supply of toweling. Furthermore, when an endless towel is used, the toweling is always under tension due to its being pulled through the apparatus so that it tends to tear and wear out more quickly. Another disadvantage is that it is extremely difficult to originally install or replace an endless towel. Furthermore, when part of an endless towel becomes torn or badly stained, the entire towel has to be replaced.

It is an object of the present invention, therefore, to provide a novel, self-contained towel-dispensing and laundering apparatus which employs a plurality of individually supported towels. More particularly, it is an object to provide a device of the type described which includes a plurality of individual towels mounted on a conveyor whereby the clean towels are systematically exposed for use, one at a time, and after being used are automatically laundered to return them to a clean condition for reuse. Specifically, it is an object to provide a device including a pair of spaced flexible conveyor chains which support a series of tubular members extending between them, and on each of which is mounted one end of an individual towel which is systematically exposed for use, and after being used, is automatically laundered to place it in clean, dry condition for reuse.

Another object is to provide a novel towel-dispensing and laundering apparatus which employs a plurality of individually supported towels which can be easily and quickly individually replaced when they become worn out or stained.

Another object is to provide a towel-dispensing and laundering apparatus which contains a series of individual towels which are supported at one end only, and which are overlapped within the device so as to occupy a minimum amount of space.

Another object is to provide a towel-dispensing and laundering apparatus which includes means for automatically washing, rinsing and drying the soiled towels as they are withdrawn from use.

Another object is to provide a towel-dispensing and laundering apparatus which includes a conveyor for the towels which, upon the manual actuation of the control mechanism, withdraws the soiled towel from use and immediately immerses it in the cleaning solution, and which, after a predetermined period of time, presents a fresh towel for use.

Another object is to provide a towel-dispensing and laundering apparatus which contains means for washing and rinsing soiled towels, for wringing the water from the towels after washing and rinsing, and for drying and pressing the towels prior to their reuse.

Further objects and advantages of the present invention will be apparent from the following description, reference being had to the accompanying drawings wherein a preferred embodiment of the present invention is shown, in which:

Fig. 1 is a side, elevational view of a towel-dispensing and laundering apparatus embodying the teachings of the present invention;

Fig. 2 is a front, elevational view of the device taken from the right of Fig. 1;

Fig. 3 is an enlarged, fragmentary, vertical, side, sectional view taken on the line 3—3 in Fig. 2;

Fig. 4 is an enlarged, fragmentary, vertical, front, sectional view taken on the line 4—4 in Fig. 1; and Fig. 5 is an enlarged, fragmentary, sectional view of one end of a towel supporting member.

Referring to the drawings more particularly by reference numerals, 10 indicates generally a towel-dispensing and laundering apparatus constructed in accordance with the teachings of the present invention.

The device includes a vertically extending housing which contains a front wall 12, a rear wall 14, and opposed side walls 16. A door 17 is contained in one of the side walls 16 to provide access to the interior of the housing for maintenance and repair, as will appear.

As shown in Figs. 2 and 3, the front wall 12 contains a horizontal slot 18 through which the individual towels protrude. Also mounted on the front wall 12 is a control button 20 slightly below the slot and to one side of it for setting the control mechanism in operation. If desired, a mirror 22 can be mounted on the front wall 12 above the slot 18.

A pair of horizontally disposed partitions 24 and 26 (Fig. 3) are contained within the housing to divide it into an upper chamber 28, an intermediate chamber 30, and a lower chamber 32.

The individual towels, the conveyor for the towels, and the equipment for washing, rinsing and drying the towels are disposed within the intermediate chamber 30 in a manner which will now be described.

Rotatably mounted within the intermediate chamber 30 so as to extend crosswise of the housing between the side walls 16, are a series of shafts which have a sprocket gear adjacent each end. As shown in Fig. 3, there are two pairs of small upper sprocket gears 34, two pairs of small lower sprocket gears 36, a pair of small intermediate sprocket gears 38, and a pair of large intermediate sprocket gears 40. Mounted on each set of sprocket gears adjacent each side of the housing in a manner to be described, is an endless sprocket-chain conveyor 42. Each sprocket-chain 42 extends over the top sprocket gears 34 adjacent one side of the housing, downwardly in back of the front wall 12, past the slot 18, around the lower sprocket gears 36, upwardly, over and around the small intermediate sprocket gears 38, downwardly and under the large intermediate sprocket gear 40, and upwardly over the top sprocket gears 34.

Fastened to the links of each of the conveyor chains 42, at spaced intervals, are a series of inwardly extending pins 44 (Fig. 5). Tubular towel-supporting members 46 having their ends bent inwardly to form bearing surfaces 48, extend crosswise between the conveyor chains 42 and are supported on opposed pins 44.

Looped about each supporting member 46 is one end of a rectangular-shaped individual towel 50 (Fig. 5). One end of each of the towels is fastened to the body portion adjacent thereto by a row of stitching 52 to form a sleeve-like portion which fits loosely around the supporting member 46.

Spaced inwardly from each end of each of the towel supporting members 46 is a flanged ferrule 54 to prevent the towels from moving sidewise and becoming fouled in the conveyor chains 42.

As shown in Fig. 3, a wash tank 56 is supported on the lower partition 26 so as to enclose the bottom portions of the chains 42 and the lower sprocket wheels 36.

Mounted within the washing tank 56 is an agitator 57 which is actuated by suitable means (not shown) to maintain the cleaning solution within the wash tank in constant movement when the towels 50 are passing through it, as will appear. The cleaning solution used in the wash tank is preferably water containing suitable amounts of soap and detergents, the latter preferably being of the types which do not require rinsing.

Extending crosswise of the intermediate chamber 30 immediately above the wash tank 56 are two wash wringer rolls 58. The wringer rolls 58 are of a length to extend between the ferrules 54 on the towel supporting members 46 and are disposed one on each side of the conveyor chains 42 so that the towels 50 pass between them. The rear wall of the wash tank 56 extends upwardly and forwardly over the rear wringer roll 58, as at 60, to prevent the cleaning solution from splashing off the roller and against the rear wall 14 of the housing.

Mounted above the wash tank 56 and wash wringer rollers 58, is a rinse tank 62 which encloses the large intermediate sprocket gears 40. Two rinse wringer rollers 64 extend crosswise of the housing between the conveyor chains 42 above the rinse tank 62 in a manner similar to the wash wringer rollers 58, previously described. The rollers 64 wring the rinse solution from the towels 50 when a rinse solution is used. Manifestly, if a washing solution is used which does not require rinsing, the rinse solution is omitted from the rinse tank 62.

The front wall of the rinse tank 62 extends upwardly and rearwardly over the front rinse roller 64, as at 66, to prevent the rinse solution from being splashed onto the fresh towels 50 at the front of the device, or out through the slot 18.

A baffle plate 68 extends forwardly from the rear wall 14 of the rear rinse roller 64 to prevent the rinse solution from splashing upwardly, and also to prevent the washer and rinse solutions from being evaporated by the action of the drier and exhaust fan, which will now be described.

Fastened to the rear wall 14 of the housing is an electric heater 70 which is energized through conductors 72, which protrude from the rear of the housing. If desirable, a suitable thermostat can be employed to maintain the upper portion of the intermediate chamber 30 at a constant predetermined temperature.

Louvers 74 are provided in that portion of each of the side walls 16 of the housing adjacent the heater 70, and an exhaust fan 76 is mounted in the upper chamber 28 to draw the air in through the louvers 74 and over the towels 50 which have just passed through the rinse rollers 64. As shown in Fig. 4, the inlet of the exhaust fan 76 extends through the upper partition 24 into the intermediate chamber 30, and its outlet extends out of the top of the housing.

The bottom chamber 32 of the housing forms a water storage tank for making-up the loss in the wash tank 56 and the rinse tank 62. Suitable controls and connections (not shown) are provided between the various tanks to control the liquid level in the wash and rinse tanks and to automatically replenish them from the storage tank when the liquids therein fall below a predetermined level. Manifestly, the storage tank can be refilled manually or it can be connected to a water supply such as the regular city water mains and filled automatically. The mode of refilling the storage tank is dependent solely on the means available at the particular installation.

The mechanism for automatically feeding a fresh towel through the slot 18 to make it available for use and for retracting it, when the control button 20 is actuated, will now be described.

Mounted in back of the front wall 12 above the slot 18 are two feed rollers 78 (Figs. 3 and 4). These feed rollers 78 extend between the ferrules 54 on the towel supporting members 46 and are disposed on each side of the conveyor chains 42 so that the towels 50 pass between them.

Mounted below the slot 18 in like manner are two retracting rollers 80.

An electric motor 82 is contained in the upper chamber 28 for actuating the feed rollers 78, the retracting rollers 80, and the sprocket conveyor chains 42 through chain drives, one of which is shown at 84 in Fig. 4, and suitable control mechanism (not shown), in a manner which will be described.

*Operation*

In the start or inoperative position all of the towels are contained within the housing, and the inner end of a clean towel is disposed adjacent the upper edge of the slot 18 and below the feed rollers 78.

When a prospective user presses the control button 20, the control mechanism is set in operation whereby the feed rollers 78 are rotated to cause the free end of the fresh towel to be ejected through the slot 18.

After a suitable predetermined time delay which would give a reasonable safety margin on the average use of a towel, the control mechanism causes the conveyor chains 42 supporting the towels 50 to move downwardly past the slot 18 so as to position the inner end of the soiled towel below the retracting rolls 80. The retracting rolls are then automatically caused to rotate so as to draw the soiled towel into the housing and cause the lower portion of it to fall into the wash tank 56 before the dirt has time to "set."

This downward movement of the conveyor chains 42 also carries the inner end of the clean towel, disposed above the slots 18, downwardly below the feed rollers 78 so as to place it in position to be ejected for the use of the next person to press the control button 20.

As the conveyor chains 42 move in a clockwise direction within the housing, as viewed in Fig. 3, the soiled towels 50 are carried through the wash tank 56 where they are subjected to the wash solution which is forced through the interstices in the towels by the movement of the agitator 57. From the wash tank 56 the towels 50 pass between the wash wringer rollers 58 which squeeze the wash solution from them and back into the wash tank 56. The towels 50 then pass upwardly around the small intermediate sprocket wheels 38 and thence into the rinse tank 62. From the rinse tank 62 the towels pass upwardly through the rinse wringer rollers 64. As the towels 50 leave the rollers 64 they are dried by the radiant heat from the heater 70 and by the air currents which enter the louvers 74, are warmed by the heater 70, and pass upwardly and out through the exhaust fan 76. As shown in Fig. 3, the conveyor chains 42 adjacent the heater 70 are inclined at an angle toward the heater so as to cause the towels to billow out so that the heated air can more easily pass between them.

When the towels 50 pass over the upper sprocket gears 34 they are superimposed one on top of the other whereby they are flattened and pressed. If desirable, a yieldable ironing shoe can be fastened to the underside of the upper partition 24 so as to bear on the towels 50 and iron them as they pass beneath it.

If any of the towels 50 become worn or badly soiled so that it is desirable to replace them, this can be easily and quickly accomplished as follows: the operator merely opens the door 17, reaches into the housing and spreads apart the conveyor chains 42, removes the towel holder 46 from between its supporting pins 44, replaces the towel on the holder, and replaces the tubular holder 46 between its supporting pins.

Thus, it is apparent that there has been provided a novel towel dispensing and laundering apparatus which fulfills all of the objects and advantages sought therefor.

The attachment members for supporting the towels can be spaced at close intervals with the towels superimposed on top of one another so that for a given size of apparatus more towel surface can be provided than when an endless type of towel is used.

The towels are not severely stretched in passing through the machine because they are individually supported and drawn by one end. Consequently, the life of the towels will be greatly increased over the endless type of towel.

Furthermore, individual towels which are worn out or badly stained can be easily and quickly replaced without disturbing the other parts of the apparatus.

It is to be understood that the foregoing description and the accompanying drawings have been given only by way of illustration and example, and that changes and alterations in the present disclosure, which will be readily apparent to one skilled in the art, are contemplated as within the scope of the present invention, which is limited only by the claims which follow.

What is claimed is:

1. A device of the type described, comprising a housing including a front wall containing an aperture therein; conveyor means within the housing passing adjacent the aperture; a plurality of individual towels mounted on the conveyor at spaced intervals; means for moving the conveyor past the aperture; means for causing a portion of one towel at a time to extend through the aperture for use; means for withdrawing the towel into the housing after use; and means within the housing for conditioning the towels for reuse.

2. A device of the type described, comprising a housing including a front wall containing an aperture therein; conveyor means within the housing passing adjacent the aperture; a plurality of individual towels mounted on the conveyor at spaced intervals adjacent one end; means for moving the conveyor past the aperture; means for causing the free end of one towel at a time to extend through the aperture for use; means for withdrawing the free end of the towel into the housing after use; and means within the housing for conditioning the towels for reuse.

3. A device of the type described, comprising a housing including a front wall containing an aperture therein; conveyor means within the housing passing adjacent the aperture; a plurality of individual towels mounted on the conveyor at spaced intervals; means for moving the conveyor past the aperture; a cleaning solution container within the housing; means for causing a portion of one towel at a time to extend through the aperture for use; and means for withdrawing the towel into the housing and directly into the cleaning solution container after use.

4. A device of the type described, comprising a housing including a front wall containing an aperture therein; conveyor means within the housing passing adjacent the aperture; a plurality of individual towels mounted on the conveyor at spaced intervals, each of the towels being removably fastened thereto adjacent one end; means for moving the conveyor past the aperture; means for causing the free end of one towel at a time to extend through the aperture for use; means for withdrawing the free end of the towel into the housing after use; and means within the housing for conditioning the towels for reuse.

5. A device of the type described, comprising a housing including a front wall containing an aperture therein; conveyor means within the housing passing adjacent the aperture; a plurality of rod-like members removably mounted on the conveyor at spaced intervals; individual towels removably mounted adjacent one end on the rod-like members; means for moving the conveyor past the aperture; means for causing the free end of one towel at a time to extend through the aperture for use; means for withdrawing the towel into the housing after use; and means within the housing for conditioning the towels for reuse.

6. A device of the type described, comprising a housing including a front wall containing an aperture therein; conveyor means within the housing passing adjacent the aperture; a plurality of rod-like members removably mounted on the conveyor at spaced intervals; individual towels removably mounted adjacent one end on the rod-like members; the spacing of the rod-like members and the length of the towels being such that the latter overlap within the housing so as to conserve space; means for moving the conveyor past the aperture; means for causing the free end of one towel at a time to extend through the aperture for use; means for withdrawing the towel into the housing after use; and means within the housing for conditioning the towels for reuse.

7. A device of the type described, comprising a housing including a front wall containing an aperture therein; conveyor means within the housing passing adjacent the aperture; a plurality of rod-like members removably mounted on the conveyor at spaced intervals so as to extend crosswise of the housing; individual towels removably mounted adjacent one end on the rod-like members; means limiting the sidewise movement of the towels on the rod-like members; means for moving the conveyor past the aperture; means for causing the free end of one towel at a time to extend through the aperture for use; means for withdrawing the free end of the towel into the housing after use; and means within the housing for conditioning the towels for reuse.

8. A device of the type described, comprising a housing including a front wall containing an aperture therein; conveyor means within the housing passing adjacent the aperture; a plurality of individual towels mounted on the conveyor at spaced intervals; a pair of feed rollers disposed above the aperture adjacent the conveyor for causing the free end of one towel at a time to extend through the aperture for use; a pair of retracting rollers disposed below the aperture for withdrawing the free end of the towel into the housing after use; and means for intermittently moving the conveyor from the feed rollers toward the retracting rollers.

9. A towel dispensing and laundering apparatus, comprising a housing including a front wall containing an aperture therein; a wash tank disposed within the housing below the aperture; a rinse tank disposed above the wash tank; conveyor means within the housing passing adjacent the aperture; a plurality of individual towels mounted on the conveyor; the conveyor extending from adjacent the aperture through the wash tank and through the rinse tank and thence back to adjacent the aperture; a first set of wringer rollers disposed adjacent the conveyor above the wash tank; and a second set of wringer rollers disposed adjacent the conveyor above the rinse tank.

10. A towel dispensing and laundering apparatus, comprising a housing including a front wall containing an aperture therein; a wash tank disposed within the housing below the aperture; a rinse tank disposed above the wash tank; conveyor means within the housing passing adjacent the aperture; a plurality of individual towels mounted on the conveyor; the conveyor extending from adjacent the aperture through the wash tank and through the rinse tank and thence back to adjacent the aperture; and a heat source adjacent the conveyor above the rinse tank.

11. A towel dispensing and laundering apparatus, comprising a housing including a front wall containing an aperture therein; a wash tank disposed within the housing below the aperture; a rinse tank disposed above the wash tank; conveyor means within the housing passing adjacent the aperture; a plurality of individual towels mounted on the conveyor; the conveyor extending from adjacent the aperture downwardly through the wash tank, thence upwardly to above the rinse tank, thence downwardly through the rinse tank, thence upwardly to adjacent the top of the housing, and thence downwardly to adjacent the aperture.

12. A towel dispensing and laundering apparatus, comprising a housing including a front wall containing an aperture therein; a wash tank disposed within the housing below the aperture; a rinse tank disposed above the wash tank; conveyor means within the housing passing adjacent the aperture; a plurality of individual towels mounted on the conveyor; the conveyor extending from adjacent the aperture downwardly through the wash tank, thence upwardly to above the rinse tank, thence downwardly through the rinse tank, thence upwardly and rearwardly to adjacent the top of the housing, and thence downwardly to adjacent the aperture; and means for passing heated air through the towels as they pass from the rinse tank toward the upper end of the housing.

WILLIS L. WELLS.

References Cited in the file of this patent

UNITED STATES PATENTS

| Number | Name | Date |
|---|---|---|
| 750,883 | McCasland | Feb. 2, 1904 |
| 1,405,419 | Joy | Feb. 7, 1922 |
| 1,778,777 | Trinks et al. | Oct. 21, 1930 |
| 2,045,828 | Borroughs | June 30, 1936 |
| 2,190,879 | Mayfield | Feb. 20, 1940 |
| 2,295,955 | La Page | Sept. 15, 1942 |
| 2,366,136 | Waldstein | Dec. 26, 1944 |